United States Patent [19]

Lipschutz

[11] 4,176,867

[45] Dec. 4, 1979

[54] LOCKING CAP FOR FUEL TANK WITH REMOTE UNLOCKING CONTROL

[75] Inventor: Paul Lipschutz, Croissy, France

[73] Assignee: Neiman S.A., Courbevoie, France

[21] Appl. No.: 839,080

[22] Filed: Oct. 3, 1977

[30] Foreign Application Priority Data

Oct. 6, 1976 [FR] France .................... 76 29999

[51] Int. Cl.[2] ............................................ E05B 47/00
[52] U.S. Cl. .................................................. 292/201
[58] Field of Search ................ 292/201, 144, 341.16; 70/160, 162, 270, 161

[56] References Cited

U.S. PATENT DOCUMENTS

| 320,617 | 6/1885 | Blattmann | 292/341.16 |
|---|---|---|---|
| 1,316,595 | 9/1919 | Rehdorf | 292/216 |
| 3,543,547 | 12/1970 | Sugujama | 292/341.16 X |
| 3,759,075 | 9/1973 | Lipschutz | 70/162 |
| 3,765,709 | 10/1973 | Van Wyck | 292/341.16 X |
| 3,767,242 | 10/1973 | Quanty | 292/201 X |

Primary Examiner—Richard E. Moore
Attorney, Agent, or Firm—William A. Drucker

[57] ABSTRACT

The locking cap for fuel tanks is provided with electromechanical locking means whereby the cap can be unlocked by remote control. The cap comprises a body member having a lid pivotable thereon. A spring-urged pivotable locking device on said body engages a spindle attached to the underside of the lid to hold the latter in a locked position. A spring-urged locking slider engageable with a stop formed on said locking device is controlled by a pair of pivoted armatures which are articulated to said slider.

On energization of a U-shaped electromagnet attracting the armatures the latter effect disengagement of the slider from the locking device which releases the spindle thus unlocking the lid.

3 Claims, 4 Drawing Figures

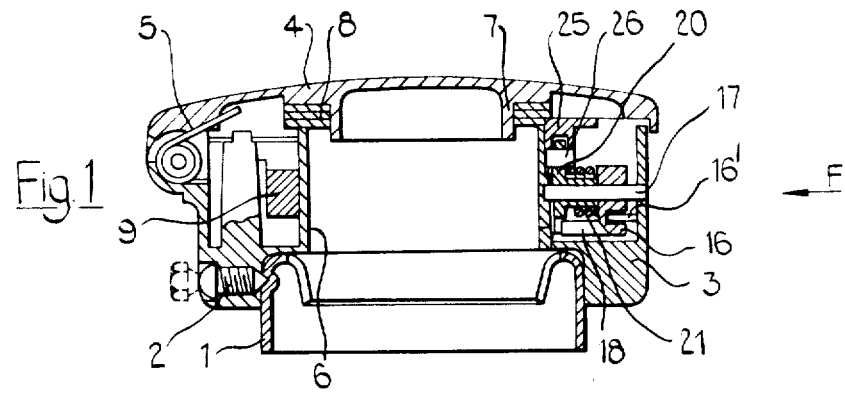
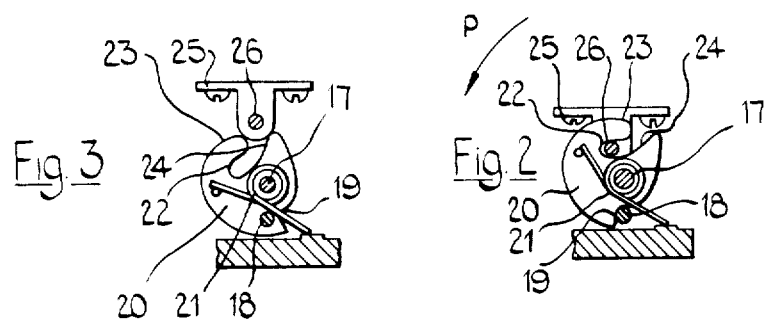
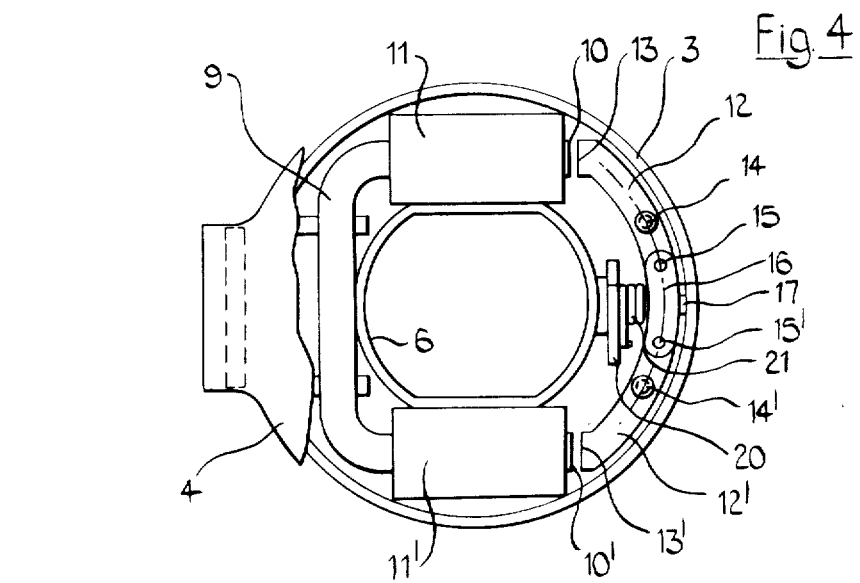

LOCKING CAP FOR FUEL TANK WITH REMOTE UNLOCKING CONTROL

BACKGROUND OF THE INVENTION

The invention relates to improvements in locking caps for fuel tanks with remote unlocking control. It has been proposed to equip such a cap with remotely controlled unlocking means, for example controlled from the anti-theft device key of the vehicle which is equipped with the tank (French Pat. No. 2,097,590).

It has also been proposed to control the unlocking by means of a U-shaped electromagnet acting upon an armature of yoke form the translational movement of which causes the rotation of a pivoting locking hook (French Patent No. 2,127,258). Such arrangements are disclosed in U.K. patent no. 1,362,223).

It has been perceived that there is danger of this device being broken open by means of suitable impacts which, by reason of the mass of the armature, cause its translational movement and thus unlocking of the cap.

The present invention aims at eliminating this risk of breaking open by impacts.

SUMMARY OF THE INVENTION

According to the present invention there is provided a locking cap for a fuel tank comprising a body member, a lid pivotable on the body member, a pivotable locking device on said body member, means engageable by said locking device for holding the lid in a locked position, a locking slider capable of holding said locking device in a locked position of said lid, a U-shaped electromagnet on said body member and two armatures mounted on said body member for pivoting at an intermediate point of their length and respectively articulated at their extremities remote from the electromagnet to said locking slider. In the cap according to the invention the displacement of the armatures by energisation of the electromagnet causes a displacement of the slider in the opposite direction. Thus impacts which can cause a translational movement of the armatures towards the electromagnet tending to produce a translational movement of the slider in the same direction do not in fact permit of obtaining displacement of the armatures since this displacement is thwarted by the slider.

BRIEF DISCRIPTION OF DRAWINGS

The invention will be clearly understood on reading of the following description given with reference to the accompanying drawing, wherein:

FIG. 1 is an axial sectional view, partially broken away, of a cap according to one form of embodiment of the invention in the locking position;

FIG. 2 is an elevational view in the direction of the arrow F in FIG. 1 of a part of the cap, the wall being omitted;

FIG. 3 is analogous with FIG. 2, but for the unlocking position, and

FIG. 4 is a partially broken away plan view of the cap according to FIGS. 1 and 2.

DESCRIPTION OF PREFERRED EMBODIMENT

The cap according to the invention, intended to be fixed on a petrol tank mouth 1, by means of a screw 2 with break-off head, comprises a substantially cylindrical hollow body 3 on which there is articulated a lid 4 thrust into the open position by a spring 5. The body 3 comprises a central chimney 6 in communication with a tank and closed by an internal projection 7 of the lid 4, with interposition of a sealing washer 8.

In the body 3 there is lodged a U-shaped electromagnet the two extremities 10 and 10' of which are surrounded by energisation windings 11 and 11' respectively. Two armatures 12 and 12' cooperate by their extremities 13 and 13' respectively with the extremities 10 and 10' of the electromagnet 9. The armatures 12 and 12' are mounted for pivoting on spindles 14 and 14' respectively and are articulated, at their extremities opposite to the electromagnet 9, on spindles 15 and 15' fast with a slider 16 which is subject to the action of a spring 16' which thrusts it towards the centre. The slider 16 is guided in sliding by a radial rod 17 and carries a radial pin 18.

When the slider is in the position as represented in FIGS. 1 and 4, where it is closet to the centre of the chimney 6, the armatures 12 and 12' being spaced from the electromagnet 9, the pin 18 cooperates with a stop 19 (FIGS. 2 and 3) of a flap 20 mounted for pivoting about the axis of the radial rod 17 and subject to the action of a torsion spring 21. The pivoting flap 20 further comprises a notch 22 forming a nose 23 and a cam profile 24.

The lid 4 comprises a stirrup piece 25 carrying a radial spindle 26 disposed so as to cooperate with the notch 22 of the pivoting flap 20. In the locking position as represented in FIGS. 1, 2 and 4, the spindle 26 is lodged at the bottom of the notch 22 and held prisoner there by the nose 23. Impacts which may be applied to the periphery of the body 3 cannot liberate the spindle 26 since the normal displacements of the armatures 12, 12' on the one part and of the slider 16 on the other take place in the opposite direction.

When the electromagnet is energised the armatures 12 and 12' are attracted towards the extremities 10 and 10' respectively of the electromagnet 9 and the slider 16 is displaced towards the periphery of the housing 3. As soon as the pin 18 escapes from the stop 19, the flap 20 pivots under the action of the spring 21 in the direction of the arrow P (FIG. 2) and comes to occupy the position as represented in FIG. 3. The spindle 26 is liberated by reason of the rotation of the nose 23, and the lid 4 opens under the action of the spring 5.

In closing the spindle 26 encounters the cam surface 24 and causes the rotation of the flap 20 in the direction opposite to that of the arrow P, the spindle 26 sliding to the bottom of the notch 22. As soon as the stop 19 is no longer opposite to the extremity of the pin 18, the slider 16 moves under the action of the spring 16' towards the centre, bringing the pin 18 into cooperation with the stop 19 and spacing the armatures 12 and 12' from the electromagnet 9.

In the example as described the lid 4 acts as a stopper, closing the mouth 1 of the tank. The body 3 can of course be constituted by the bodywork of the vehicle, the lid 4 constituting a lockable flap door. The extremity of the mouth 1 is then closed by an ordinary screw-type or bayonet-type stopper.

I claim:

1. A locking cap for a fuel tank comprising,
   (a) a body member,
   (b) a lid pivotable on the body member,
   (c) a pivotable locking device on said body member,
   (d) means mounted on the lid engageable by said locking device for holding the lid in a locked position, (e) a locking slider capable of holding said locking device in a locked position of said lid,
(f) a U-shaped electromagnet on said body member and
(g) two armatures mounted on said body member for pivoting at an intermediate point of their length and respectively articulated at their extremities remote from the electromagnet to said locking slider.

2. A locking cap according to claim 1, wherein the pivotable locking device comprises a stop cooperating with a pin fast with the said slider, a notch forming a hook and a cam, a return spring for the pivotable locking device, said means engageable by said locking device being a spindle cooperating with the said notch.

3. A locking cap according to claim 1 wherein the slider is subject to the action of a spring thrusting it into the locking position.

* * * * *